(12) United States Patent
Xu et al.

(10) Patent No.: US 10,911,751 B2
(45) Date of Patent: Feb. 2, 2021

(54) METHOD AND APPARATUS FOR VIDEO CODING

(71) Applicant: Tencent America LLC, Palo Alto, CA (US)

(72) Inventors: Meng Xu, San Jose, CA (US); Xiang Li, Los Gatos, CA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 16/423,831

(22) Filed: May 28, 2019

(65) Prior Publication Data

US 2020/0092545 A1 Mar. 19, 2020

Related U.S. Application Data

(60) Provisional application No. 62/731,786, filed on Sep. 14, 2018.

(51) Int. Cl.
| | |
|---|---|
| *H04N 19/105* | (2014.01) |
| *H04N 19/132* | (2014.01) |
| *H04N 19/159* | (2014.01) |
| *H04N 19/176* | (2014.01) |
| *H04N 19/46* | (2014.01) |
| *H04N 19/513* | (2014.01) |
| *H04N 19/117* | (2014.01) |

(52) U.S. Cl.
CPC ......... *H04N 19/105* (2014.11); *H04N 19/117* (2014.11); *H04N 19/132* (2014.11); *H04N 19/159* (2014.11); *H04N 19/176* (2014.11); *H04N 19/46* (2014.11); *H04N 19/513* (2014.11)

(58) Field of Classification Search
CPC .. H04N 19/105; H04N 19/159; H04N 19/132; H04N 19/117; H04N 19/46; H04N 19/513; H04N 19/176
See application file for complete search history.

(56) References Cited

U.S. PATENT DOCUMENTS

| 2011/0176611 A1 | 7/2011 | Huang et al. |
| 2018/0091816 A1 | 3/2018 | Chien et al. |
| 2018/0184085 A1* | 6/2018 | Yang .................... H04N 19/154 |

(Continued)

OTHER PUBLICATIONS

High Efficiency Video Coding , Rec. ITU-T H.265v4, Dec. 2016.

(Continued)

*Primary Examiner* — Nasim N Nirjhar
(74) *Attorney, Agent, or Firm* — Oblon, McClelland, Maier & Neustadt, L.L.P.

(57) ABSTRACT

According to an aspect of the disclosure, processing circuitry decodes a constrain flag from a coded video bitstream. The constrain flag is indicative of an exclusion of decoder-side motion vector derivation (DMVD) for reference sample reconstruction. Further, the processing circuitry decodes prediction information of a current block from the coded video bitstream. The prediction information is indicative of an intra prediction mode. Then, the processing circuitry determines, in a same picture as the current block, reference samples for a sample in the current block based on the intra prediction mode and based on the exclusion of the DMVD, and reconstructs the sample of the current block according to the reference samples.

9 Claims, 15 Drawing Sheets

(56) References Cited

U.S. PATENT DOCUMENTS

2018/0278950 A1* 9/2018 Chen .................... H04N 19/577
2019/0260996 A1* 8/2019 Zhang .................. H04N 19/132

OTHER PUBLICATIONS

B. Bross, J. Chen, S. Liu, "Versatile Video Coding (Draft 2)", ISO/IEC JTC1/SC29/WG11 JVET-K1001, Jul. 2018.
S. Esenlik, Y.-W. Chen, F. Chen, "Description of Core Experiment 9 (CE9): Decoder Side Motion Vector Derivation", ISO/IEC JTC1/SC29/WG11 JVET-K1029, Jul. 2018.
International Search Report and Written Opinion dated Nov. 25, 2019 in PCT/US2019/049752 filed Sep. 5, 2019. p. 1-14.

* cited by examiner

METHOD AND APPARATUS FOR VIDEO CODING

INCORPORATION BY REFERENCE

This present disclosure claims the benefit of priority to U.S. Provisional Application No. 62/731,786, "FILTERS AND INTRA PREDICTION CONSTRAINTS IN DECODER SIDE MOTION VECTOR DERIVATION AND REFINEMENT" filed on Sep. 14, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

SUMMARY

Aspects of the disclosure provide methods and apparatuses for video encoding/decoding. In some examples, an apparatus for video decoding includes receiving circuitry and processing circuitry.

According to an aspect of the disclosure, the processing circuitry decodes a constrain flag from a coded video bitstream. The constrain flag is indicative of an exclusion of decoder-side motion vector derivation (DMVD) for reference sample reconstruction. Further, the processing circuitry decodes prediction information of a current block from the coded video bitstream. The prediction information is indicative of an intra prediction mode. Then, the processing circuitry determines, in a same picture as the current block, reference samples for a sample in the current block based on the intra prediction mode and based on the exclusion of the DMVD, and reconstructs the sample of the current block according to the reference samples.

In some embodiments, the processing circuitry determines the reference samples according to the intra prediction mode with the reference samples being reconstructed without using the DMVD.

In an embodiment, the constrain flag has a first potential value indicative of a permit of reference sample reconstruction using intra prediction, has a second potential value indicative of a permit of reference sample reconstruction using intra prediction and inter prediction, and has a third potential value indicative of the exclusion of the DMVD.

In another embodiment, the processing circuitry decodes a first constrain flag indicative of a permit of reference sample reconstruction using intra prediction and inter prediction, and decodes the constrain flag that is a second constrain flag indicative of the exclusion of the DMVD for the reference sample construction.

In another embodiment, the processing circuitry decodes a first constrain flag indicative of a permit of reference sample reconstruction using intra prediction, and decodes the constrain flag that is a second constrain flag indicative of the exclusion of the DMVD for the reference sample construction.

In another embodiment, the processing circuitry decodes a first constrain flag indicative of a permit of reference sample reconstruction using intra prediction, and infers, based on the first constrain flag, the exclusion of the DMVD for the reference sample construction.

In another embodiment, the processing circuitry determines the reference samples in a DMVD non-latency region according to the intra prediction mode with the reference samples available for the reconstruction of the current block without delay.

According to another aspect of the disclosure, the processing circuitry decodes prediction information for a current block in a current picture from a coded video bitstream. The prediction information is indicative of an inter prediction mode that includes a motion vector refining step and a final motion compensation step. Then, the processing circuitry uses a first interpolation filter during the motion vector refining step to determine a first refined motion vector that is indicative of a first refined reference block in a first reference frame from an initial motion vector. Further, the processing circuitry uses a second interpolation filter that is different from the first interpolation filter during the final motion compensation step to reconstruct the current block according to the first refined motion vector.

In some embodiments, the processing circuitry uses the first interpolation filter during the motion vector refining step to determine the first refined motion vector that is indicative of a first refined reference block in a first reference frame and a second refined motion vector that is indicative of a second refined reference block in a second reference frame. Further, the processing circuitry uses the second interpolation filter during the final motion compensation step to reconstruct the current block according to the first refined motion vector and the second refined motion vector.

In some examples, the first interpolation filter has equal or fewer number of taps than the second interpolation filter.

In some embodiments, the inter prediction mode is decoder-side motion vector derivation (DMVD) mode, and the first interpolation filter and the second interpolation filter are different from a third interpolation filter that is used in a non-DMVD mode. In some examples, the second interpolation filter has equal or fewer number of taps than the third interpolation filter. For example, a subtraction of a third number of taps of the third interpolation filter and a second number of taps of the second interpolation filter is larger than two times of the search range in pixel.

According to an aspect of the disclosure, the processing circuitry selects the second interpolation filter based on a change in an integer portion of the first refined motion vector. In an example, when the first refined motion vector and the initial motion vector have a same integer portion, the processing circuitry uses the third interpolation filter to replace the second interpolation filter during the final motion compensation step to reconstruct the current block according to the first refined motion vector. In another example, when the first refined motion vector and the initial motion vector have different integer portions, the processing circuitry uses the first interpolation filter to replace the second interpolation filter during the final motion compensation step to reconstruct the current block according to the first refined motion vector.

In some examples, the first interpolation filter and the second interpolation filter have lower cutoff frequency than the third interpolation filter.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
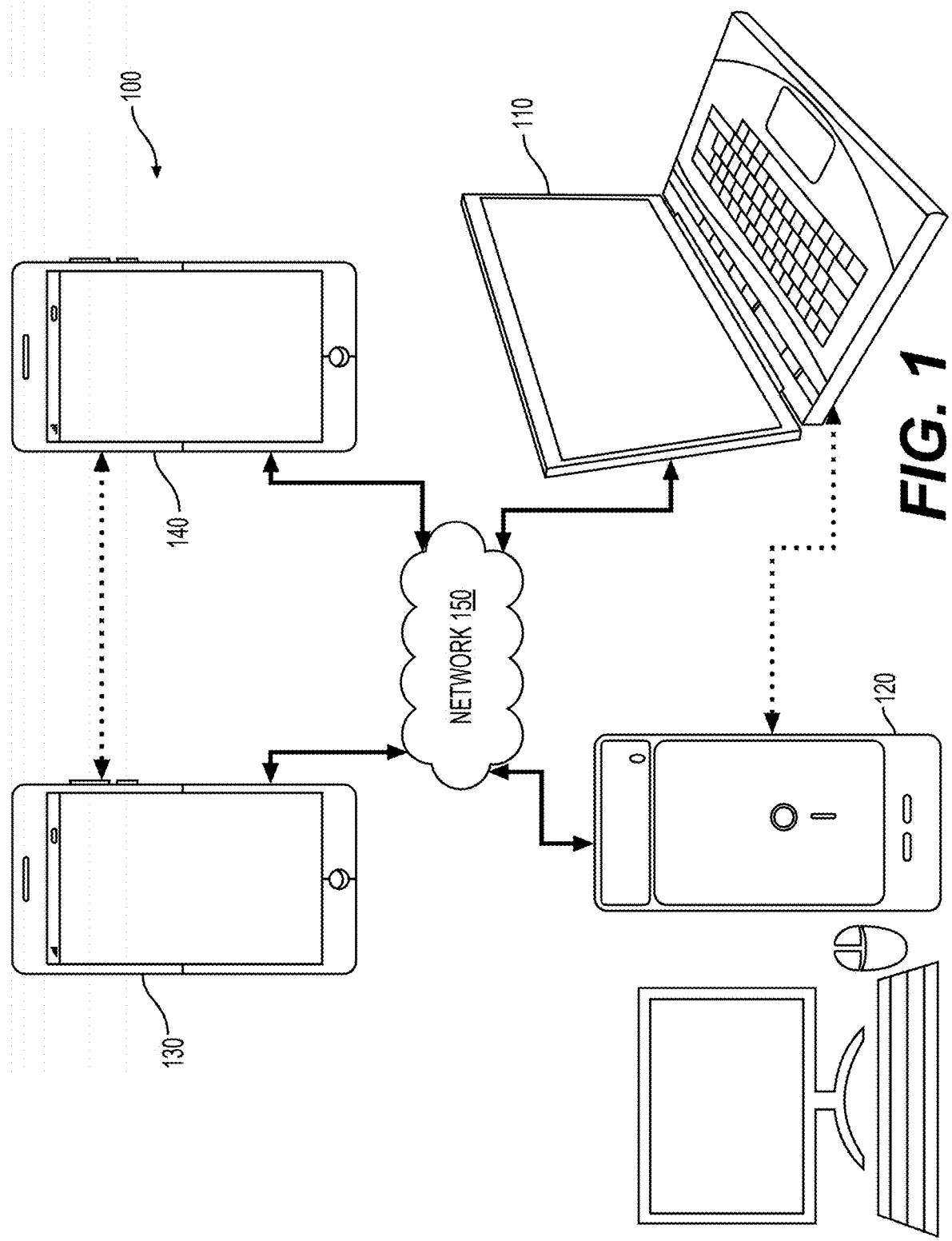
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
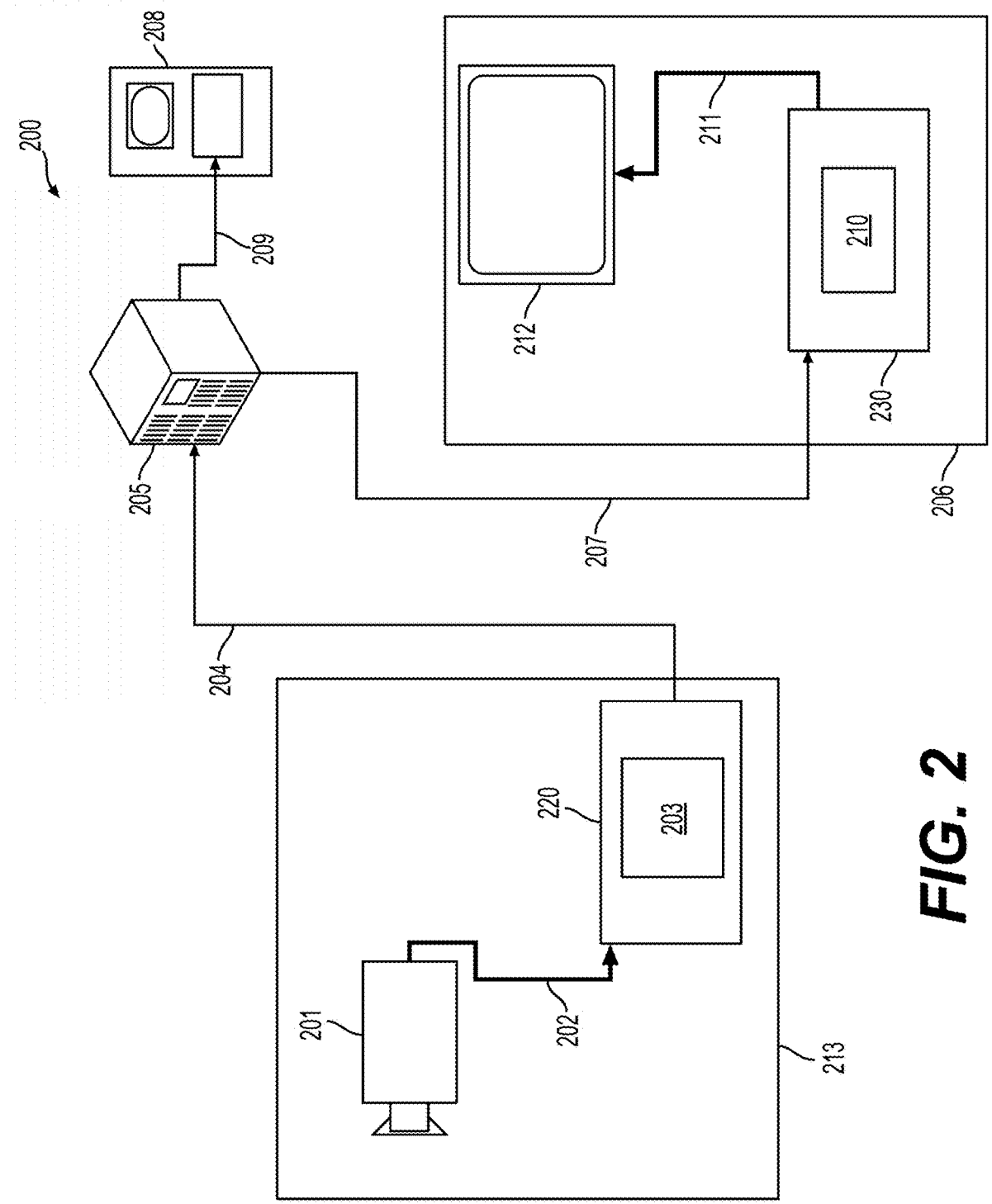
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
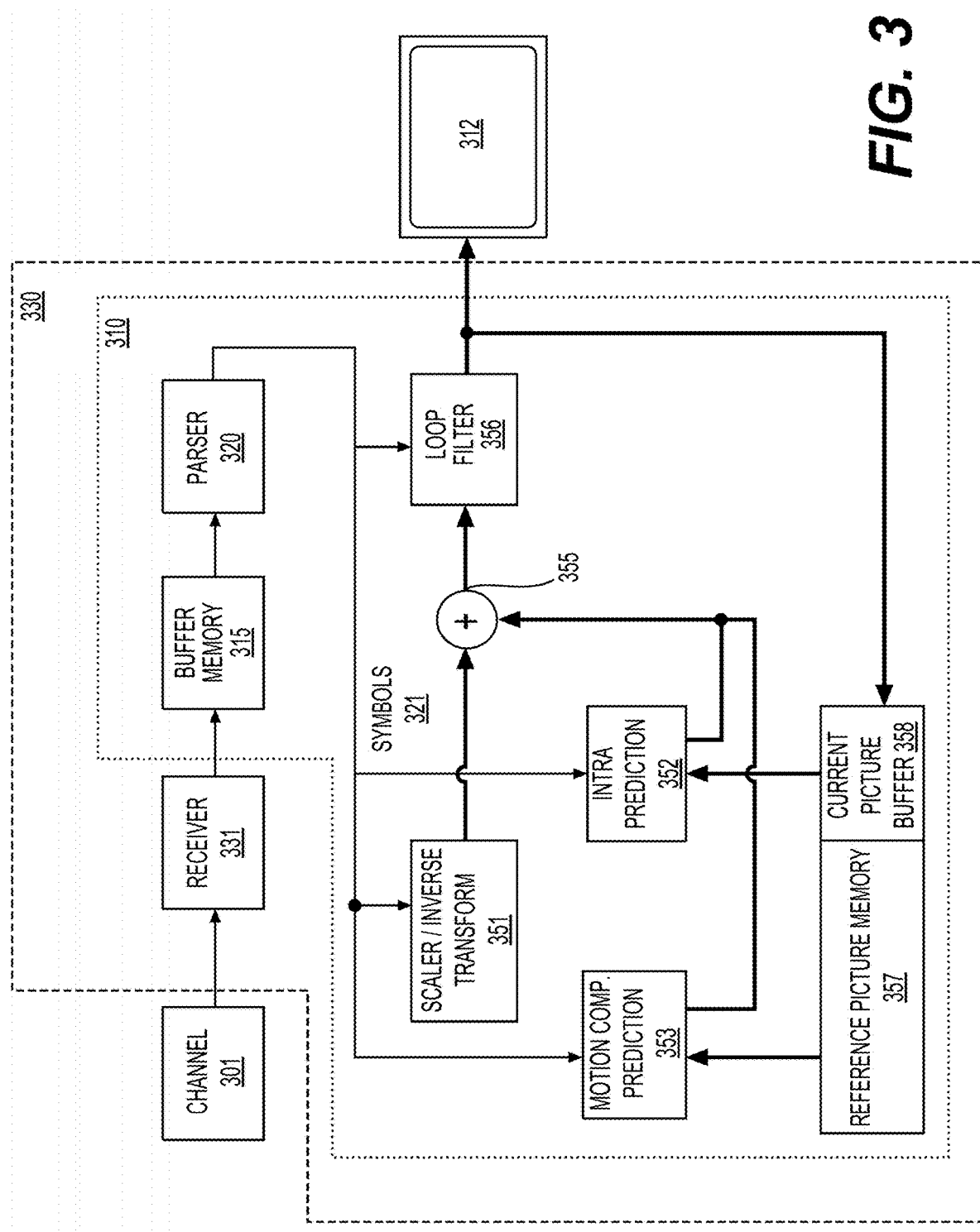
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG.

3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
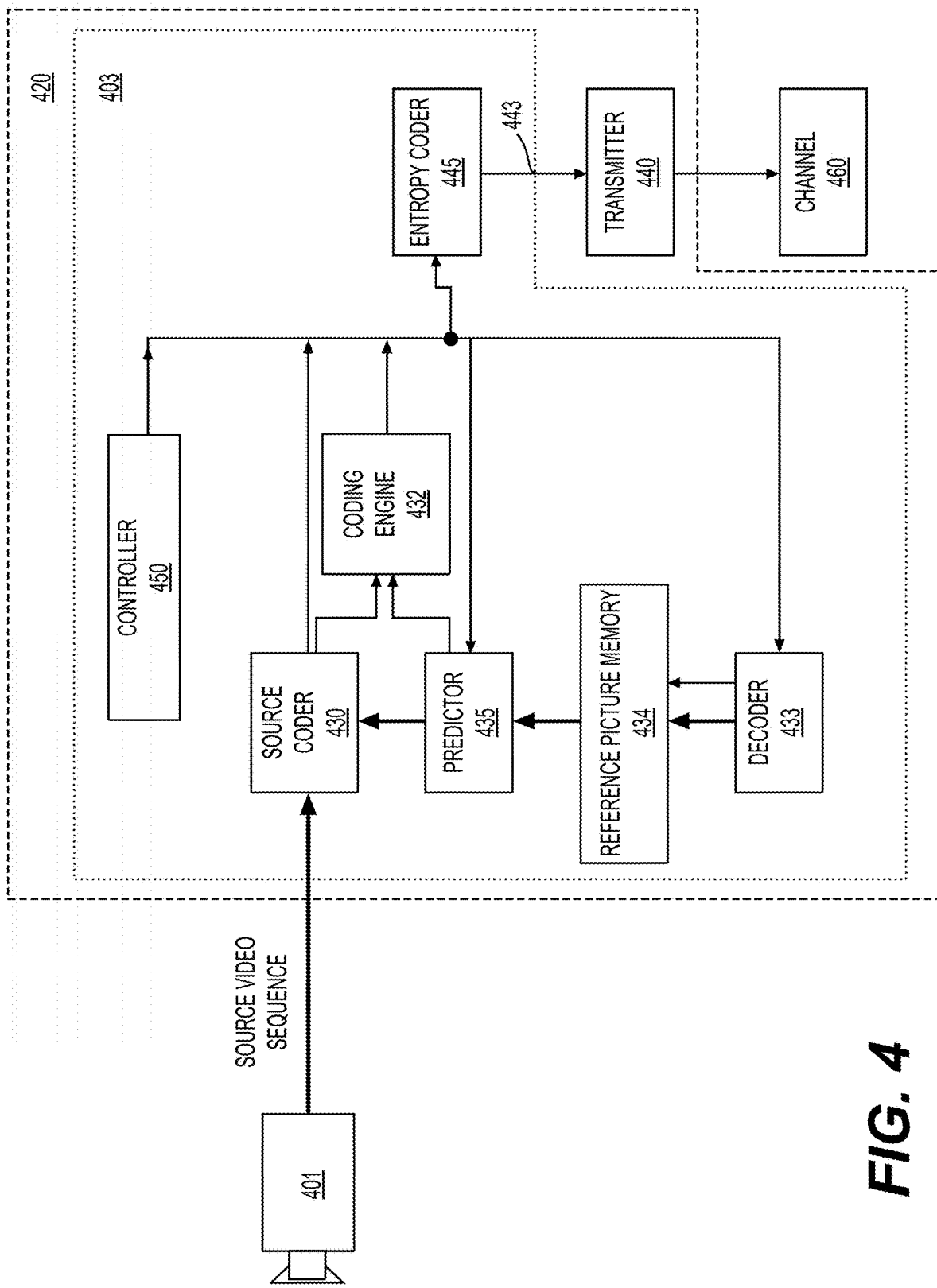
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
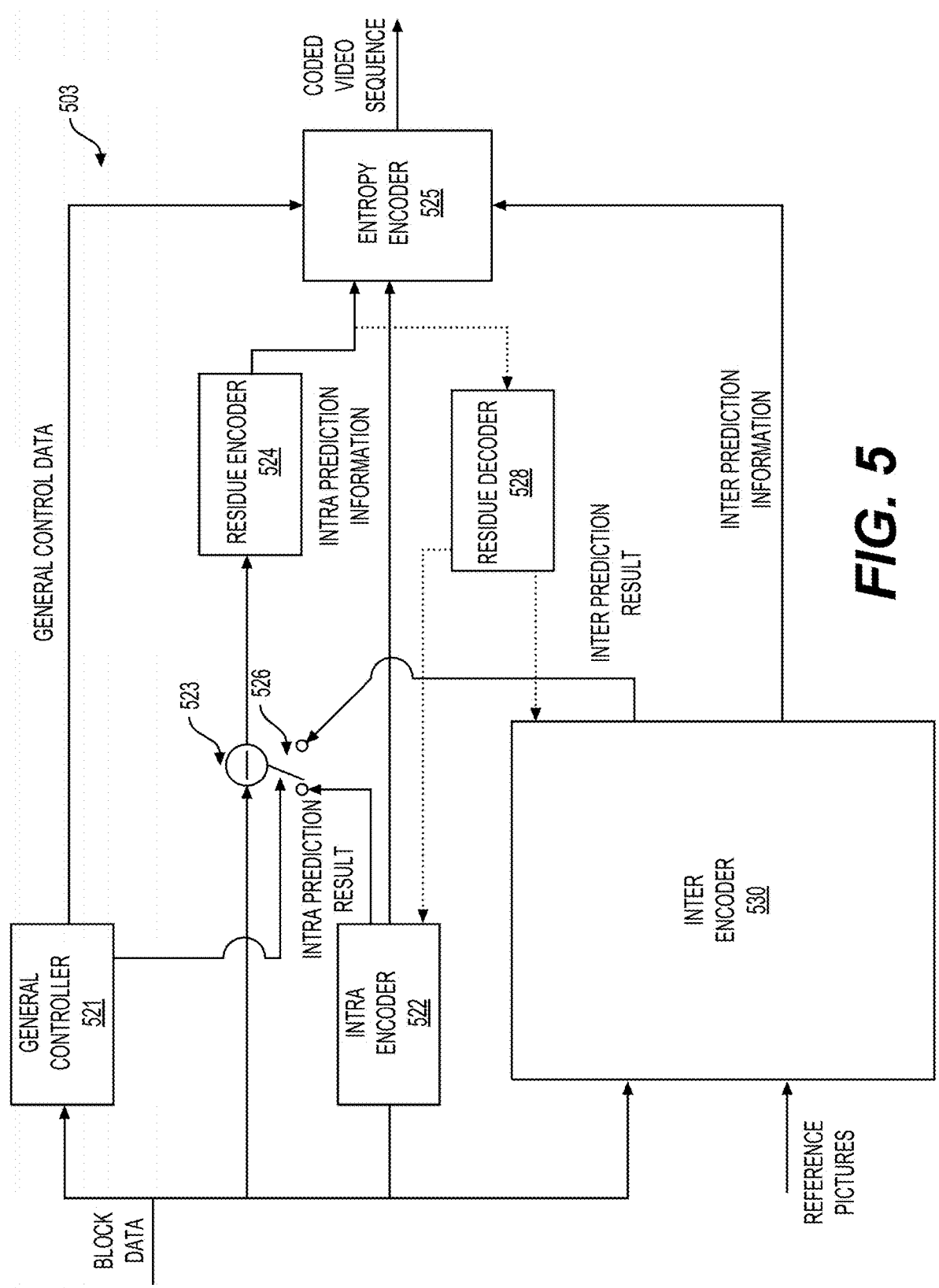
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
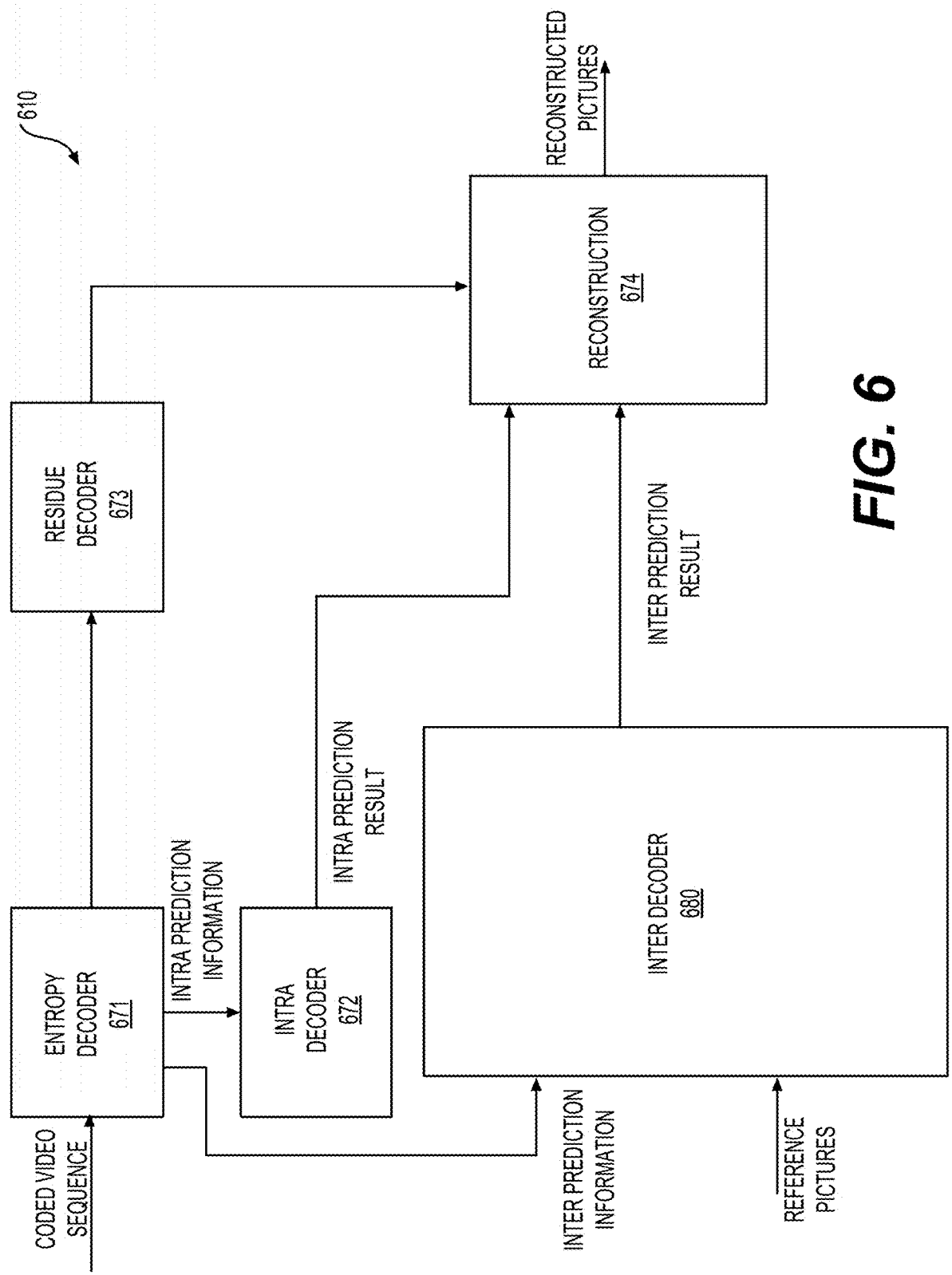
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for decoder side motion vector (MV) derivation in hybrid video coding technologies. More specifically, in some embodiments, shorter filters for the decoder side motion vector derivation (DMVD) are used to reduce the memory bandwidth during the sample interpolation in DMVD. In addition, in some embodiments, intra prediction constraints are used to reduce the coding dependency of DMVD coded blocks.

Figure 7:
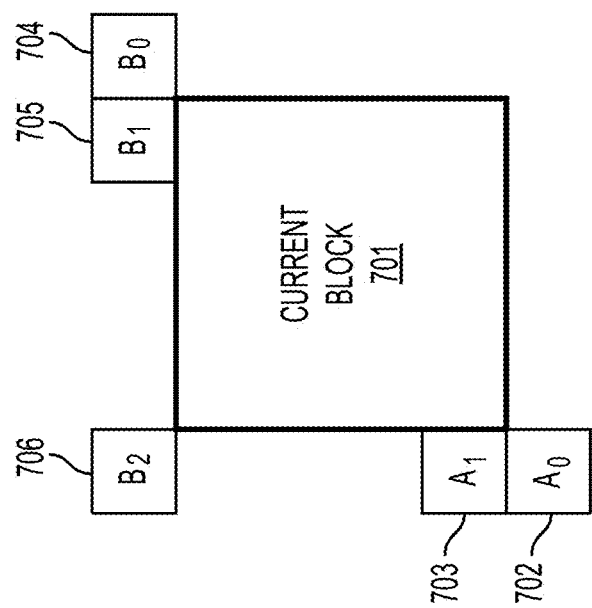
FIG. 7 shows a current block (701) and spatial merge candidates in some examples.

Referring to FIG. 7, a current block (701) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (702 through 706, respectively). In some examples, the MV prediction can use predictors from the same reference picture that the neighboring block is using.

In some embodiments, a merge mode for inter-picture prediction is used. In an example, when a merge flag (including skip flag) is signaled as true, a merge index is then signaled to indicate which candidate in a merge candidate list is used to indicate the motion vectors of the current block. At decoder, a merge candidate list is constructed based on spatial and temporal neighbors of the current block.

As shown in FIG. 7, neighboring MVs of A0, A1, and B0, B1, B2 can be added into the merge candidate list. In addition, an MV from temporal neighbors of the current block is added into the merge candidate list in an example. It is noted that additional merge candidates, such as combined bi-predictive candidates and zero motion vector candidates, and the like can be added into the merge candidate list.

According to an aspect of the disclosure, decoder side motion vector refinement (DMVR) is one of the DMVD techniques and is used to improve/refine MV based on starting points.

In some examples, in the case of bi-prediction operation, for the prediction of one block region, two prediction blocks, formed respectively using an MV0 of a first candidate list list0 and an MV1 of a second candidate list list1, are combined to form a single prediction signal that is referred to as a bilateral template. In the DMVR method, the two motion vectors MV0 and MV1 of the bi-prediction are further refined by a bilateral template matching process. The bilateral template matching applied in the decoder to perform a distortion-based search between the bilateral template and the reconstruction samples in the reference pictures to obtain a refined MV without transmission of additional motion information.

Figure 8:
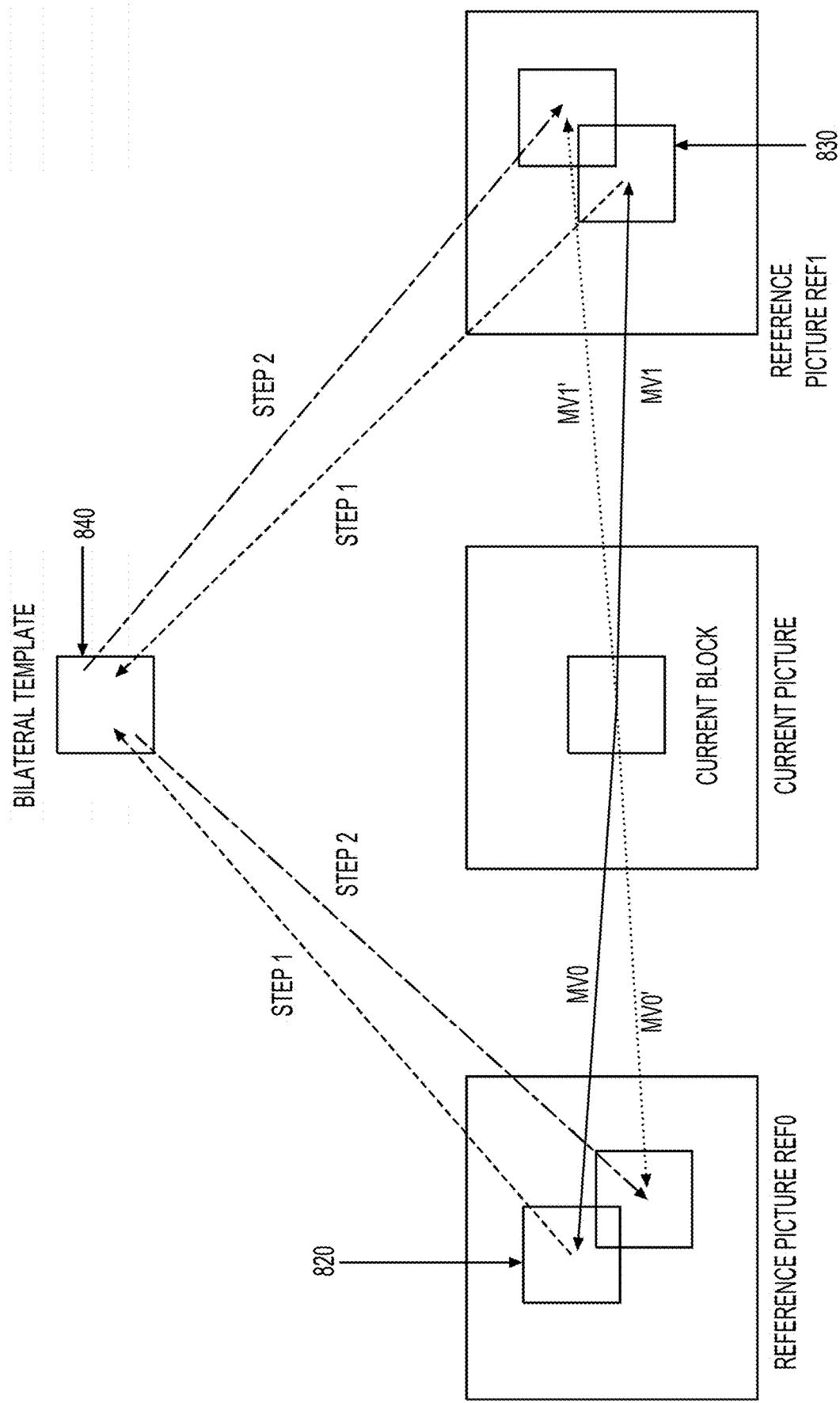
FIG. 8 shows an example of DMVR that is based on bilateral template matching.

FIG. 8 shows an example of DMVR that is based on bilateral template matching. In DMVR, the bilateral template (840) is generated as the weighted combination (i.e. average) of the two prediction blocks (820) and (830), from the initial MV0 of the first candidate list list0 and MV1 of the second candidate list list1, respectively, as shown in FIG. 8. The template matching operation includes calculating cost measures between the generated template (840) and the sample region (around the initial prediction block) in the reference pictures Ref0 and Ref1. For each of the two reference pictures Ref0 and Ref1, the MV that yields the minimum template cost is considered as the updated MV of that list to replace the original MV. For example, MV0' replaces MV0, and MV1' replaces MV1. In some examples, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 8, are used for generating the final bi-prediction results for the current block. A sum of absolute differences (SAD) can be used as the cost measure.

In some examples, DMVR is applied for the merge mode of bi-prediction with one MV from a reference picture in the past and another MV from a reference picture in the future, without the transmission of additional syntax elements. In an example, DMVR is applied in the merge mode and skip mode, when the condition in (Eq. 1) is true:

$$(POC-POC0) \times (POC-POC1) < 0 \qquad (Eq. 1)$$

where POC denotes picture order counter of the current picture, and POC0 and POC1 denote picture order counts of the two reference pictures for the current picture.

In some embodiments, based on signals in the received bitstream, a pair of merge candidates is determined and used as input to DMVR process. For example, the pair of merge candidates is denoted as initial motion vectors (MV0, MV1). In some examples, the search points that are searched by DMVR obey the motion vector difference mirroring condition. In other words, the points that are checked by DMVR, denoted by a pair of candidate motion vectors (MV0', MV1'), obey (Eq. 2) and (Eq. 3):

$$MV0'=MV0+MV_{diff} \quad (Eq.\ 2)$$

$$MV1'=MV1-MV_{diff} \quad (Eq.\ 3)$$

where $MV_{diff}$ denotes the motion vector difference between a candidate motion vector and an initial motion vector in one of the reference pictures.

Figure 9:
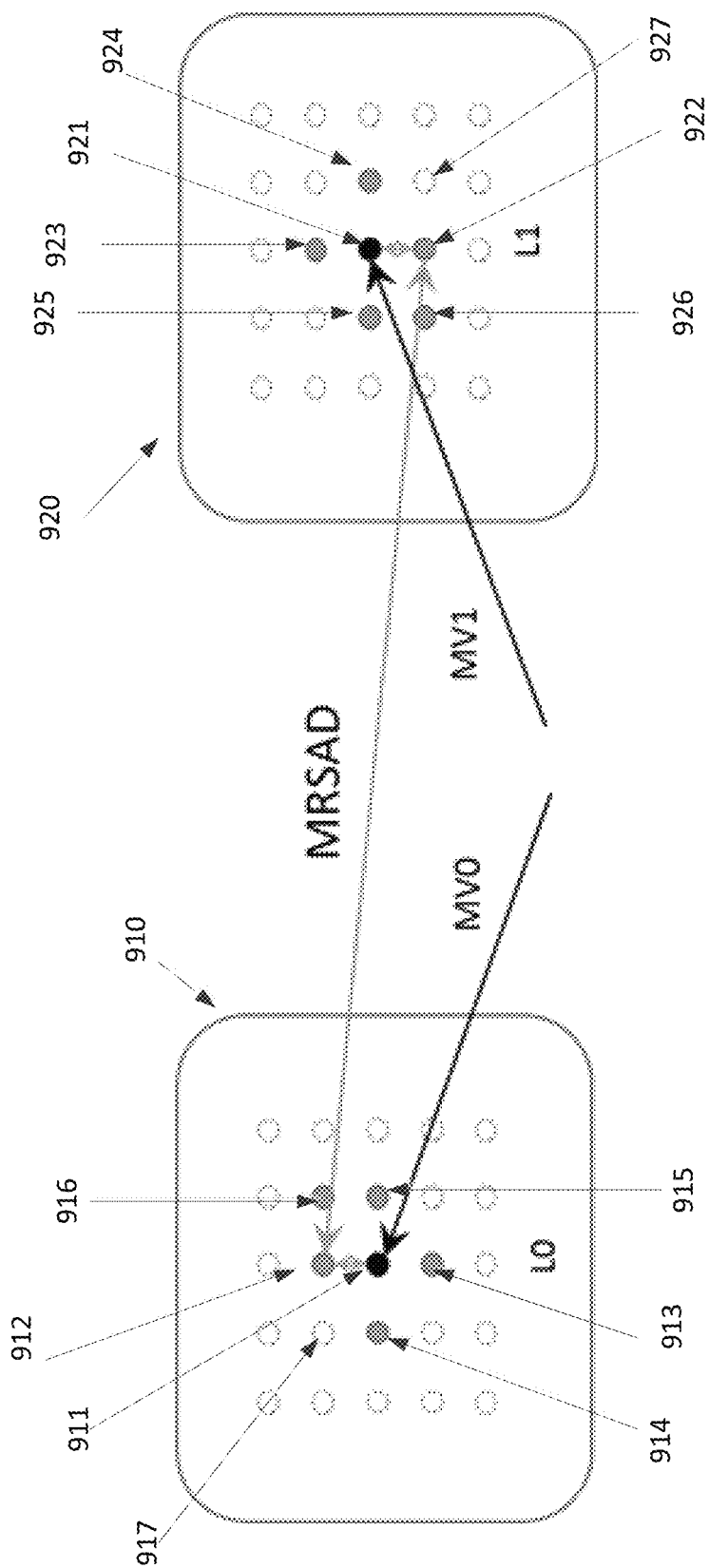
FIG. 9 shows a diagram of search spaces according to an embodiment of the disclosure.

FIG. 9 shows a diagram of a first portion (910) of the search space in a first reference picture and a second search portion (920) of the search space in a second reference picture according to an embodiment of the disclosure. The initial motion vector MV0 points to a point (911) in the first portion (910) of the search space, and the initial motion vector MV1 points to a point (921) in the second portion (920) of the search space. Further, the candidate motion vector MV0' points to a point (912) in the first portion (910) of the search space, and the candidate motion vector MV1' points to a point (922) in the second portion (920) of the search space. The points (912) and (922) satisfy the motion vector difference mirroring condition. Similarly, points (913) and (923) satisfy the motion vector difference mirroring condition; points (914) and (924) satisfy the motion vector difference mirroring condition; points (915) and (925) satisfy the motion vector difference mirroring condition; and points (916) and (926) satisfy the motion vector difference mirroring condition. In the FIG. 9 example, 6 pairs of search points are selected in the search space, and the points (911) and (921) are referred to as center points of the search space.

In some examples, after the construction of the search space, the uni-lateral predictions are respectively performed on the search points in the first portion (910) and the second portion (920) of the search space using interpolation filters, such as discrete cosine transform (DCTIF) interpolation filter. Further, bilateral matching cost function is calculated by using mean reduced sum of average difference (MRSAD) between the two uni-lateral predictions for each pair of search points, and then pair of the search points that results of the minimum cost (minimum bilateral matching cost, minimum MRSAD) is selected as the refined MV pair. In an example, for the MRSAD calculation, 16-bit precision of samples is used (which is the output of the interpolation filtering), and no clipping and no rounding operations are applied before MRSAD calculation. The reason for not applying rounding and clipping is to reduce internal buffer requirement.

In some embodiments, the integer precision search points are chosen using an adaptive pattern method. In an example, the cost (bilateral matching cost) corresponding to the central points (such as (911) and (921) pointed by the initial motion vectors) is calculated firstly. The 4 other costs, such as cost corresponding to points (912) and (922), cost corresponding to points (913) and (923), cost corresponding to points (914) and (924), and cost corresponding to points (915) and (925), are calculated. The distance from the points (912)-(915) to the center point (911) is integer number of sample resolution, such as 1 pixel (1-pel), and the distance from the points (922)-(925) to the center point (921) is also integer number of sample resolution.

Then, based on the result of the 4 other costs, the $6^{th}$ pair of search points, such as the points (916) and (926) are chosen by the gradient of the previous calculated costs. For example, when the cost of the search points (912) and (922) is smaller than the cost of the search points (912) and (923), and the cost of the search points (915) and (925) is smaller than the cost of the search points (914) and (924), then the points (916) and (926) are selected as the $6^{th}$ pair of search points. In another example, when the cost of the search points (912) and (922) is smaller than the cost of the search points (912) and (923), and the cost of the search points (914) and (924) is smaller than the cost of the search points (915) and (925), then the points (917) and (927) are selected as the $6^{th}$ pair of search points. Then, within the 6 pairs of search points, the pair of search points with the minimal cost is used to determine the refined motion vector pair (corresponding to the pair of search points with the minimal cost) that is the output of one iteration of the DMVR process.

In some embodiments, after one iteration, when the minimum cost is achieved at the central points (e.g., 911 and 921) of the search space, i.e. the motion vectors are not changed, and the refinement process is terminated. Otherwise, the search points with the minimal cost are used as the new center points to start another iteration of the DMVR process. For example, when the points (916) and (926) have the minimal cost, then points (916) and (926) are used as center points to continue a next iteration of DMVR process when the search range is not exceeded.

In some examples, when the integer precision search is terminated, half sample precision search is applied when the application of half-pel search does not exceed the search range.

Figure 10:
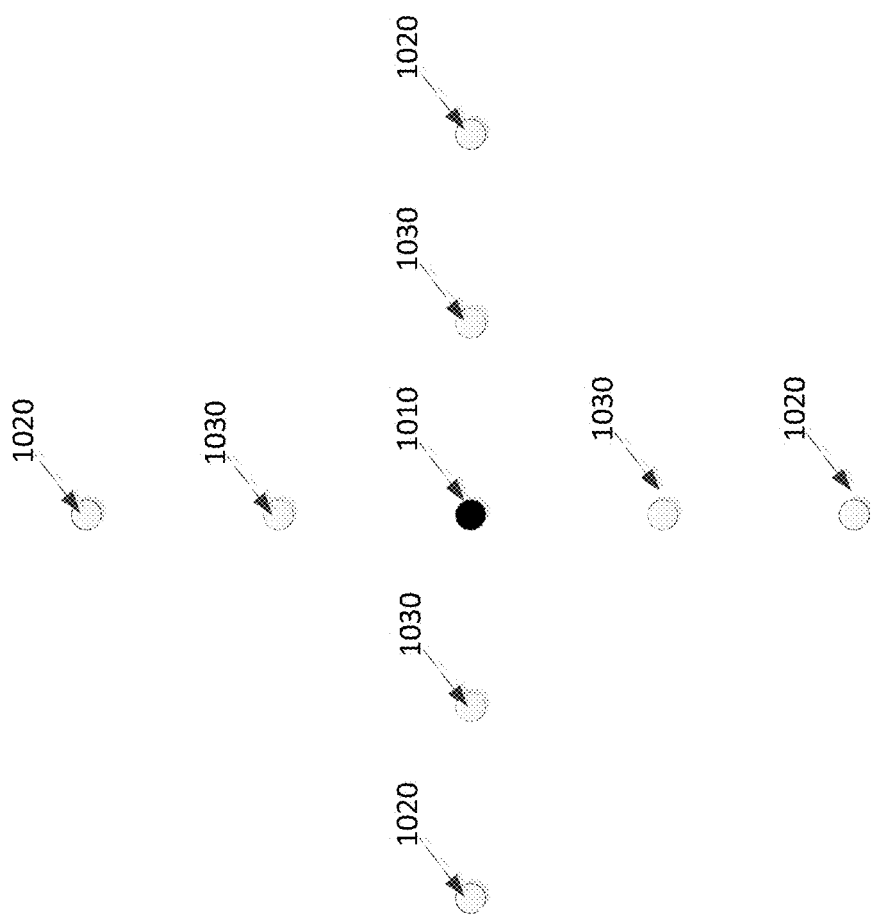
FIG. 10 shows a diagram for half-sample precision search in an example.

FIG. 10 shows a diagram for half-sample precision search in an example. In the FIG. 10 example, four search points (1020) are distanced to the center point (1010) by 1 pixel (1-pel), and can be used as the integer precision search points (e.g., points 912-915). Further, the four points (1030) are distanced to the center point (1010) by half pixel, and are used in the half-sample precision search. Similarly to the integer sample precision search, 4 MRSAD calculations are performed, corresponding to four pair of points with half-pel distance to the center points. In an example, the central points in the half-sample precision search correspond to the refined motion vector pair that is resulted from the integer precision search with the minimal cost.

Aspects of the disclosure also provide intra prediction constraints to reduce the coding dependency on DMVD coded blocks. In some embodiments, in a picture, some of the blocks are coded in the inter prediction modes and some of the blocks are coded in the intra prediction modes.

In intra prediction, sample values are represented without reference to samples or other data from previously reconstructed reference pictures. In some examples, a predictor block can be formed using neighboring sample values belonging to already available samples. Sample values of neighboring samples are copied into the predictor block according to a direction. A reference to the direction in use can be coded in the bitstream or may itself be predicted. For intra prediction, intra prediction modes can be pre-defined corresponding to the directions.

Figure 11:
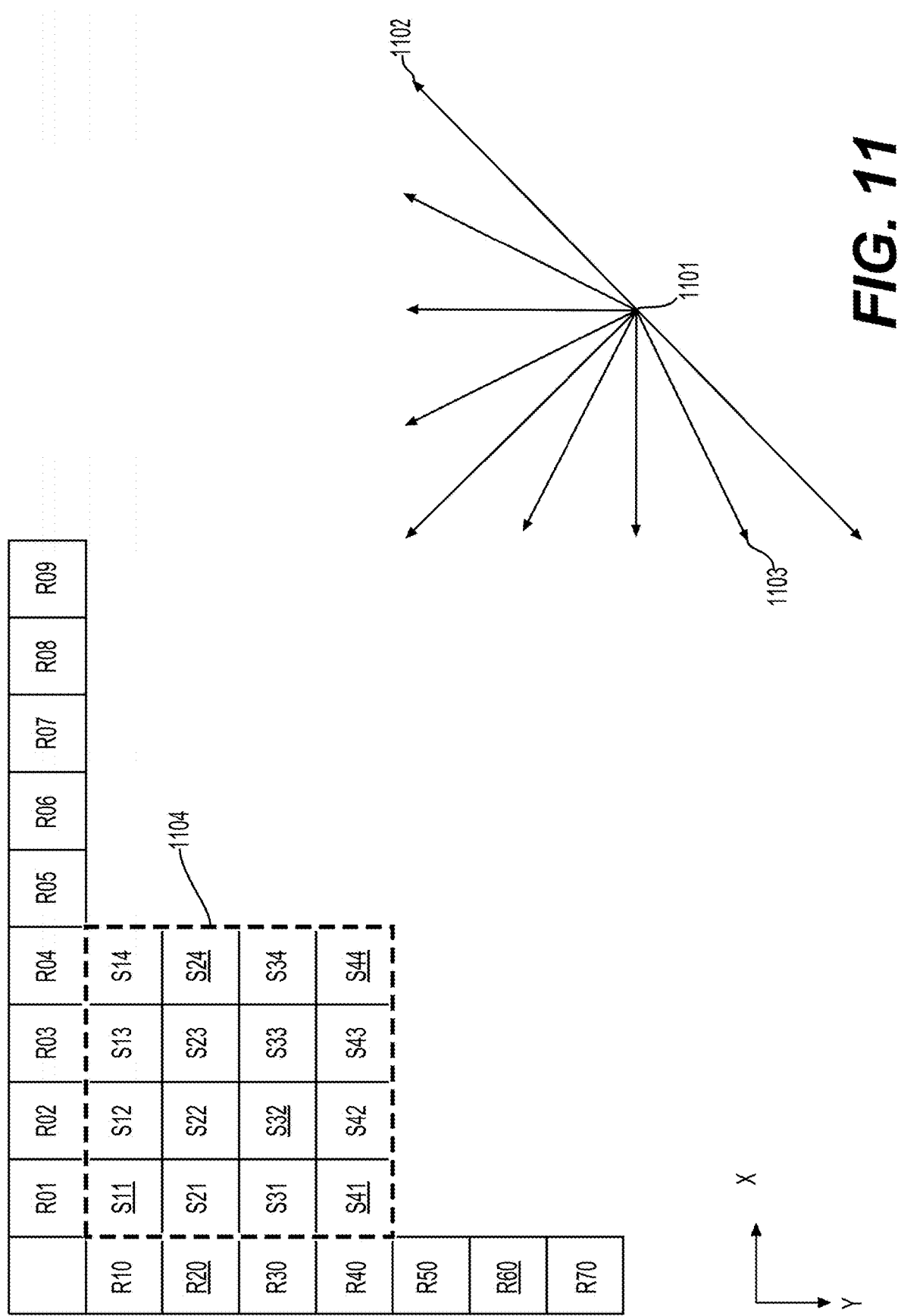
FIG. 11 shows an example of intra prediction according to an embodiment of the disclosure.

FIG. 11 shows a schematic illustration of exemplary intra prediction modes. In the FIG. 1 example, depicted in the lower right is a subset of nine predictor directions known from H.265's 33 possible predictor directions (corresponding to the 33 angular modes of the 35 intra prediction modes). The point where the arrows converge (1101) represents the sample being predicted. The arrows represent the direction from which the sample is being predicted. For example, arrow (1102) indicates that sample (1101) is predicted from a sample or samples to the upper right, at a 45 degree angle from the horizontal. Similarly, arrow (1103) indicates that sample (1101) is predicted from a sample or samples to the lower left of sample (1101), in a 22.5 degree angle from the horizontal.

Still referring to FIG. 11, on the top left there is depicted a square block (1104) of 4×4 samples (indicated by a dashed, boldface line). The square block (1104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (1104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (1104). In both H.264 and H.265, prediction samples neighbor the block under reconstruction; therefore no negative values need to be used.

Intra picture prediction (also referred to as intra prediction) can work by copying reference sample values from the neighboring samples as appropriated by the signaled prediction direction. For example, assume the coded video bitstream includes signaling that, for this block, indicates a prediction direction consistent with arrow (1102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation using interpolation filter, in order to calculate a reference sample; especially when the directions are not evenly divisible by 45 degrees.

According to an aspect of the disclosure, a flag called "constrained_intra_pred_flag" is signaled (in the video bitstream) in the Picture Parameter Set (PPS) to indicate whether constrained intra prediction is applied. When this flag is equal to 0, the reference samples used in the intra prediction may only come from reconstructed intra blocks (blocks that are reconstructed using intra prediction modes). When this flag is equal to 1, they may come from reconstructed blocks coded in either intra or inter modes.

In some examples, the filters for interpolation in motion search and final motion compensation in DMVR are proposed to reduce the memory bandwidth required to load the reference samples. In some examples, a unified filter is used for the final motion compensation in both DMVD and non-DMVD mode under certain conditions. In some examples, a latency region is proposed, from which only the non-refined MV could be used as a spatial MV predictor.

Aspects of the disclosure provide methods to improve performance of video coding that uses DMVD. In certain implementations, when constrained intra prediction is disabled, the intra prediction depends on reconstruction of, for example, a block based on DMVD. The DMVD takes relatively long time and increases the coding latency. Also, the condition for using a unified DMVD motion compensation filter is too strict and may degrade the coding performance.

The proposed methods may be used separately or combined in any order. Further, the methods (or embodiments) may be implemented by processing circuitry (e.g., one or more processors or one or more integrated circuits). In one example, the one or more processors execute a program that is stored in a non-transitory computer-readable medium.

In the following, the term block may be interpreted as a prediction block (or a prediction unit, i.e. PU), a coding block, or a coding unit, i.e. CU.

According to an aspect of the disclosure, the constrains for intra prediction are extended to take into account the DMVD process. Specifically, in some examples, in addition to the options in HEVC where the reconstructed samples used in intra prediction may be intra-only or both intra and inter coded, the DMVD mode is constrained and excluded from the reconstructed sample. For example, when a block is reconstructed according to a DMVD process, a specific flag that is associated with the block is turned on to indicate that the block is reconstructed according to the DMVD process, and the block is excluded from being a reference block for another block to be reconstructed in an intra prediction mode.

According to an aspect of the disclosure, the flag that is referred to as the constrained_intra_pred_flag in the PPS can have multiple values to indicate different options. In an embodiment, the constrained_intra_pred_flag can be 0, 1, or 2. When the constrained_intra_pred_flag is equal to 0, the reference samples used in an intra prediction mode may only come from reconstructed intra blocks (blocks that are reconstructed using intra prediction modes). When the constrained_intra_pred_flag is equal to 1, the reference samples used in an intra prediction mode may come from reconstructed blocks coded in either intra prediction modes or inter prediction modes. When the constrained_intra_pred_flag is not equal to 0 and is not equal to 1, for example, the constrained_intra_pred_flag is equal to 2, the reference samples used in an intra prediction mode may only be derived from a block that is not reconstructed by DMVD process (e.g., the specific flag of DMVD for the block is not turned on).

According to another aspect of the disclosure, another flag, which is referred to as constrained_intra_pred_dmvd_flag, may be signaled (in the video bitstream) to indicate whether DMVD reconstructed samples are restricted from intra prediction modes. In an example, when the constrained_intra_pred_dmvd_flag is equal to 0, the constrained intra prediction is applied in the same way as in HEVC, for example based on the constrained_intra_pred_flag. When the constrained_intra_pred_flag is equal to 0, the reference samples used in an intra prediction mode may only come from reconstructed intra blocks (blocks that are reconstructed using intra prediction modes). When the constrained_intra_pred_flag is equal to 1, the reference samples used in an intra prediction mode may come from reconstructed blocks coded in either intra prediction modes or inter prediction modes.

In another example, when the constrained_intra_pred_dmvd_flag is equal to 1, during reconstruction, blocks in the DMVD modes are excluded from being reference blocks in the intra prediction modes, and the reference samples used in an intra prediction mode may only be derived from a block that is not reconstructed by DMVD process (e.g., the specific flag of DMVD for the block is not turned on).

In an embodiment, when the constrained_intra_pred_flag is equal to 0, the flag constrained_intra_pred_dmvd_flag is explicitly signaled, for example, immediately after the constrained_intra_pred_flag in the video bitstream. At the decoder side, the decoder can extract the constrained_intra_pred_dmvd_flag from the video bitstream.

In another embodiment, when the constrained_intra_pred_flag is equal to 0, the constrained_intra_pred_dmvd_flag is not signaled and is inferred to be 1.

At the decoder side, the decoder infers that the constrained_intra_pred_dmvd_flag is 1 when the constrained_intra_pred_flag is equal to 0.

In another embodiment, the intra reference samples are allowed to come from a DMVD coded block when the DMVD coded block is inside the DMVR non-latency regions of the current block.

Figure 12:
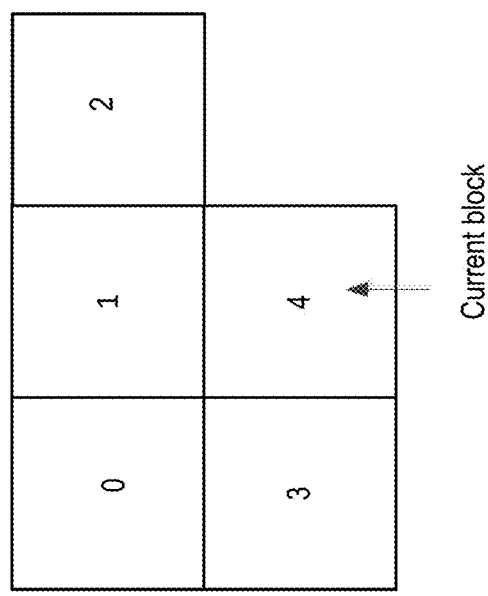
FIG. 12 shows a diagram illustrating DMVR latency region and DMVR non-latency region according to an embodiment of the disclosure.

FIG. 12 shows a diagram illustrating DMVR latency region and DMVR non-latency region according to an embodiment of the disclosure. In the FIG. 12 example, block 4 is the current block that is under reconstruction using intra prediction. The DMVR non-latency region refers to a region that can be fully reconstructed using DMVR process before the reconstruction of the current block. The latency region refers to a region that is not able to be fully reconstructed using DMVR process before the reconstruction of the current block. For example, block 1 is in the DMVR non-latency region, and other blocks that are reconstructed before the block 1, such as block 0, are also in the DMVR non-latency region. Further, block 2 is in DMVR latency region, and other blocks that are reconstructed after the block 2 and before the current block 4, such as block 3, are also in the DMVR latency region. In some examples, regardless of the constrained_intra_pred_flag or constrained_intra_pred_dmvd_flag, a decoder can use reconstructed samples in block 1 for intra prediction in block 4 according to intra prediction.

According to some aspects of the disclosure, in DMVR, different interpolation filters can be used at different steps in DMVR process. In some embodiments, a first filter of M-tap, referred to as a first filter $f_M$, is used in the motion search portion (to refine the MVs) of the DMVR process and a second filter of N-tap, referred to as a second filter $f_N$, is used in the final motion compensation (after the refined MVs are finalized) of the DMVR. M and N are two integer numbers (such as 2, 4, 6, or 8), and may or may not be equal. In some embodiments, a third filter of L-tap, referred to as a third filter $f_L$, is used in the interpolation for non-DMVD modes. M, N, and L are pre-determined for each block and not signaled in the video bitstream. In VVC, L is equal to 8 in an example.

In some embodiments, M is constrained to be smaller than or equal to N. For example, M=4, N=4, or M=4, N=8. Further, N is constrained to be smaller than or equal to L. In an embodiment, M and N are not fixed numbers, and regardless how M and N change, M is constrained to be less than or equal to N.

In some embodiments, to reduce the memory bandwidth in DMVD, certain restrictions are proposed on the first filter $f_M$ for the motion search and the second filter $f_N$ for the final motion compensation. In some examples, the constrains are represented by Eq. 4:

$$2 \times SR + M \leq L \qquad (Eq. 4)$$

where SR denotes the search range (in pixel) in DMVD. For example, when L is equal to 8, SR is equal to 1, then M is smaller than or equal to six. When L is equal to 8, SR is equal to 2, then M is smaller than or equal to four.

During the DMVR process in some embodiments, after the refined MV has been derived, when the corresponding integer parts of the refined MV and the initial MV are equal, then the third filter $f_L$ is used as the interpolation filter for the final motion compensation, and N is set to equal L. Otherwise, when the corresponding integer parts of the refined MV and the initial MV are not equal, the first filter $f_M$ is the used as the interpolation filter for the final motion compensation, and N is set to equal M.

In some embodiments, when M or N is equal to 4, the first filter $f_M$ and/or the second filter $f_N$ can be selected to have lower cutoff frequency than the third filter $f_L$ used in non-DMVD modes is used. Table 1 shows an example of a 4-tap filter that can be used as the first filter $f_M$ and/or the second filter $f_N$. Table 1 includes coefficients corresponding to phases. Thus, when an interpolation phase is determined, the coefficients of the 4-tap filter for the interpolation phase can be quickly determined based on a lookup in the Table 1.

TABLE 1

| Coefficients (multiplied by 64) for a 4-tap filter $f_4$ ||
|---|---|
| phase | coefficients |
| 0/16 | 0, 64, 0, 0 |
| 1/16 | −2, 63, 4, −1 |
| 2/16 | −4, 62, 8, −2 |
| 3/16 | −5, 59, 13, −3 |
| 4/16 | −6, 56, 18, −4 |
| 5/16 | −6, 52, 23, −5 |
| 6/16 | −7, 48, 28, −5 |
| 7/16 | −7, 44, 33, −6 |
| 8/16 | −7, 39, 39, −7 |
| 9/16 | −6, 33, 44, −7 |
| 10/16 | −5, 28, 48, −7 |
| 11/16 | −5, 23, 52, −6 |
| 12/16 | −4, 18, 56, −6 |
| 13/16 | −3, 13, 59, −5 |
| 14/16 | −2, 8, 62, −4 |
| 15/16 | −1, 4, 63, −2 |

In some embodiments, when M or N is equal to 6, the first filter $f_M$ and/or the second filter $f_N$ can be selected to have lower cutoff frequency than the third filter $f_L$ used in non-DMVD modes is used. Table 2 shows an example of a 6-tap filter that can be used as the first filter $f_M$ and/or the second filter $f_N$. Table 2 includes coefficients corresponding to phases. Thus, when an interpolation phase is determined, the coefficients of the 6-tap filter for the interpolation phase can be quickly determined based on a lookup in the Table 2.

TABLE 2

| Coefficients (multiplied by 64) for a 6-tap filter $f_6$ ||
|---|---|
| phase | coefficients |
| 0/16 | 0, 0, 64, 0, 0, 0 |
| 1/16 | 1, −3, 64, 4, −2, 0 |
| 2/16 | 1, −6, 62, 9, −3, 1 |
| 3/16 | 2, −8, 60, 14, −5, 1 |
| 4/16 | 2, −9, 57, 19, −7, 2 |
| 5/16 | 3, −10, 53, 24, −8, 2 |
| 6/16 | 3, −11, 50, 29, −9, 2 |
| 7/16 | 3, −11, 44, 35, −10, 3 |
| 8/16 | 1, −7, 38, 38, −7, 1 |
| 9/16 | 3, −10, 35, 44, −11, 3 |
| 10/16 | 2, −9, 29, 50, −11, 3 |
| 11/16 | 2, −8, 24, 53, −10, 3 |
| 12/16 | 2, −7, 19, 57, −9, 2 |
| 13/16 | 1, −5, 14, 60, −8, 2 |
| 14/16 | 1, −3, 9, 62, −6, 1 |
| 15/16 | 0, −2, 4, 64, −3, 1 |

Figure 13:
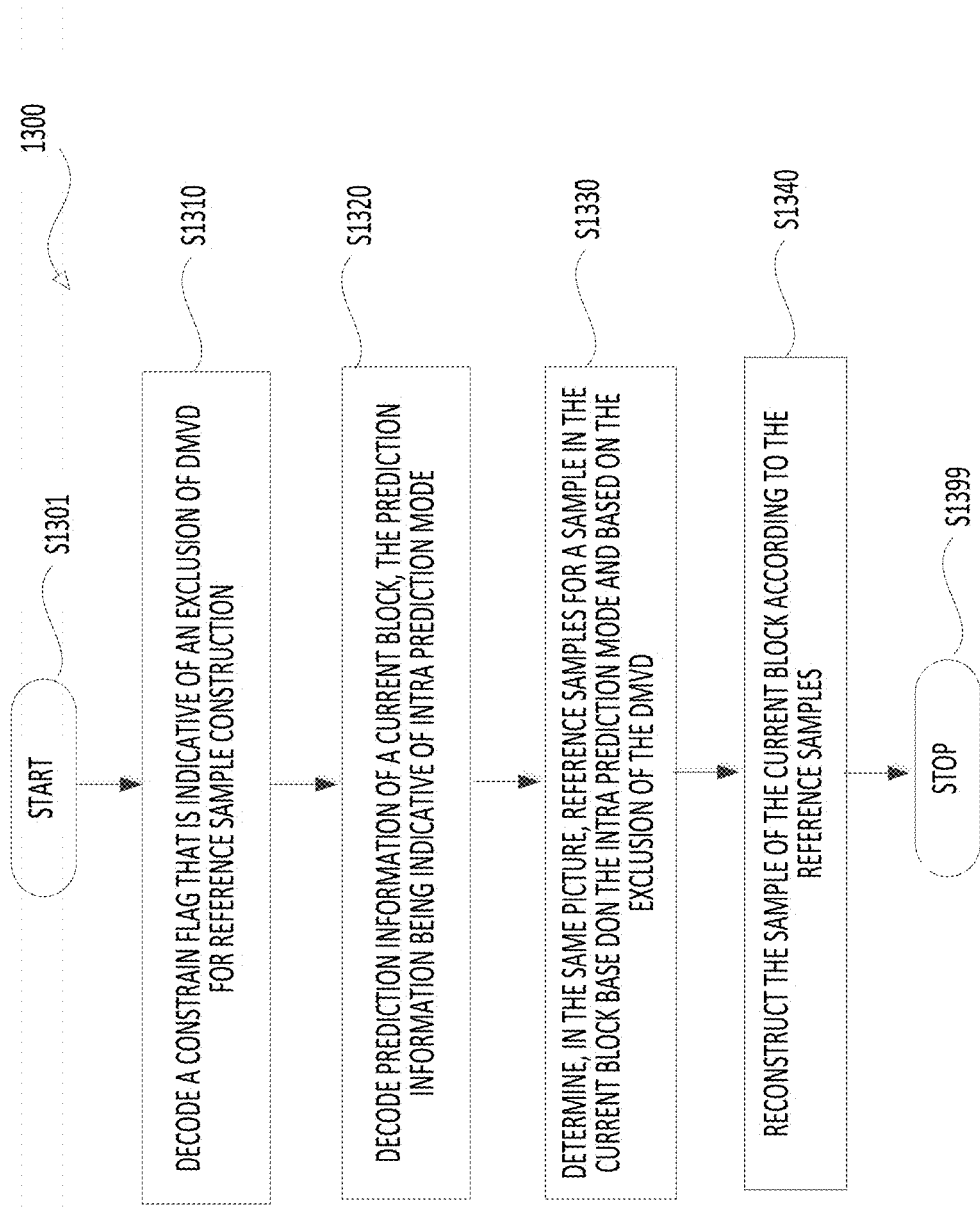
FIG. 13 shows a flow chart outlining a process example according to an embodiment of the disclosure.

FIG. 13 shows a flow chart outlining a process (1300) according to an embodiment of the disclosure. The process (1300) can be used in the reconstruction of a block coded in intra mode, so to generate a prediction block for the block under reconstruction. In various embodiments, the process (1300) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1300) is implemented in software instructions, thus when the processing circuitry executes the software instructions, the processing circuitry performs the process (1300). The process starts at (S1301) and proceeds to (S1310).

At (S1310), a constrain flag is decoded. The constrain flag is indicative of an exclusion of DMVD for reference sample reconstruction. In an example, a constrain flag, such as constrained_intra_flag, is a high-level flag that is decoded from the Picture Parameter Set (PPS) from the coded video bitstream.

At (S1320), prediction information of a current block is decoded from the coded video bitstream. The prediction information is indicative of an intra prediction mode.

At (S1330), reference samples for reconstructing a sample of the current block is determined. The reference samples are in a same picture as the current block and are determined based on the intra prediction mode and based on the exclusion of the DMVD. In some examples, the reference samples are reconstructed without using the DMVD. In another example, the reference samples are within a DMVD non-latency region with regard to the current block.

At (S1340), the sample of the current block is reconstructed based on the reference samples. Then the process proceeds to (S1399) and terminates.

Figure 14:
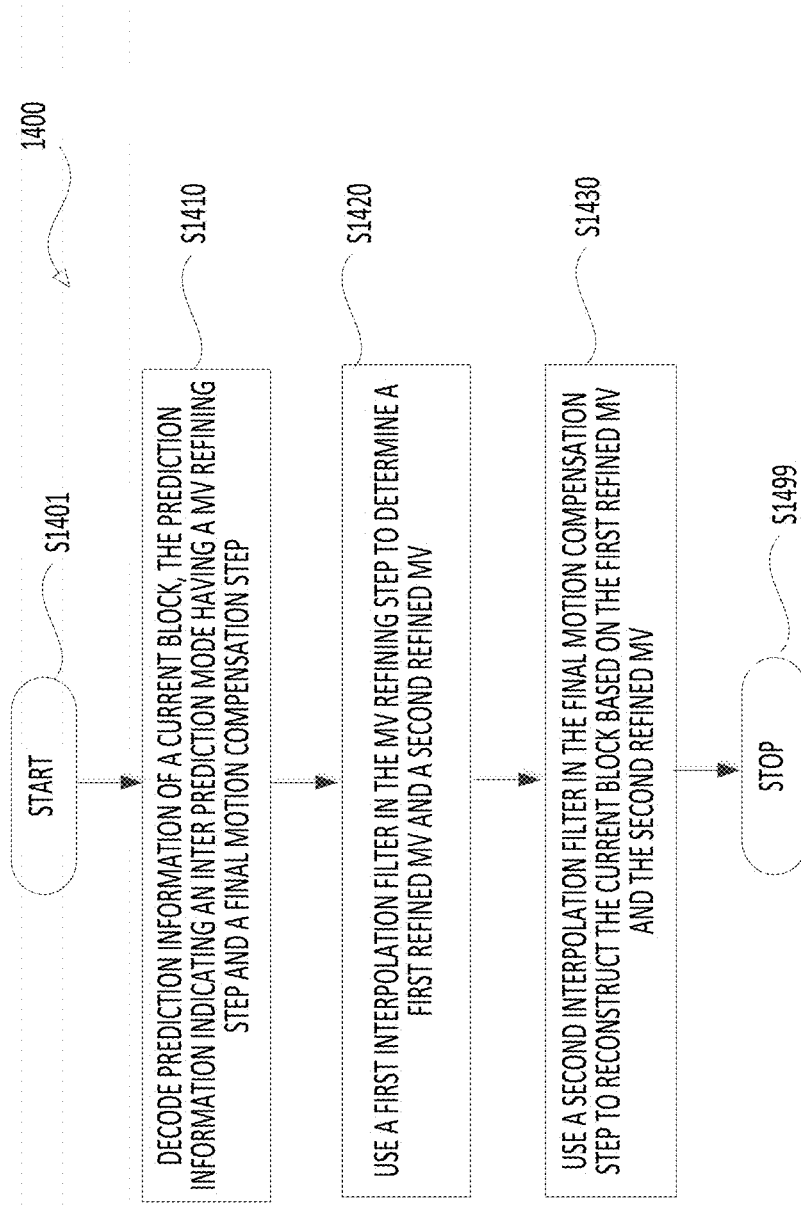
FIG. 14 shows a flow chart outlining another process example according to an embodiment of the disclosure.

FIG. 14 shows a flow chart outlining a process (1400) according to an embodiment of the disclosure. The process (1400) can be used in the reconstruction of a block coded in intra mode, so to generate a prediction block for the block under reconstruction. In various embodiments, the process (1400) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of a current block is decoded from the coded video bitstream. The prediction information indicates an inter prediction mode that includes a motion vector refining step and a final motion compensation step.

At (S1420), a first interpolation filter is used during the motion vector refining step to determine a first refined motion vector and a second refined motion vector. The first refined motion vector is indicative of a first refined reference block in a first reference frame. The second refined motion vector is indicative of a second refined reference block in a second reference frame.

At (S1430), a second interpolation filter that is different from the first interpolation filter is used during the final motion compensation step to reconstruct the current block according to the first refined motion vector and the second refined motion vector. Then the process proceeds to (S1499) and terminate.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
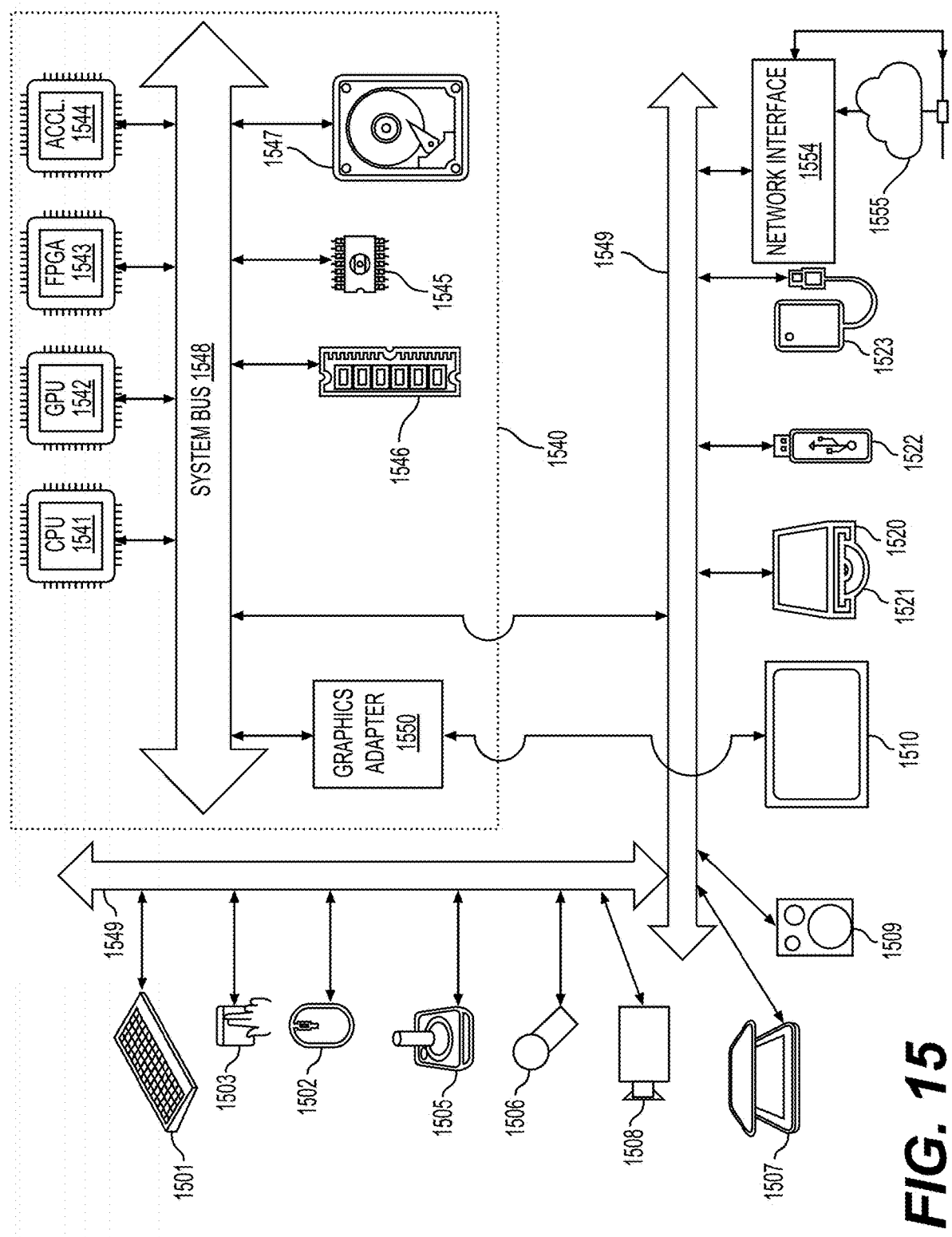
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
decoding a constraint flag from a coded video bitstream, the constraint flag being indicative of an exclusion of decoder-side motion vector derivation (DMVD) for reference sample reconstruction;
decoding prediction information of a current block from the coded video bitstream, the prediction information being indicative of an intra prediction mode;
in response to a determination that the constraint flag indicates that the DMVD is excluded for the reference sample reconstruction, determining, in a same picture as the current block, reference samples for a sample in the current block based on the intra prediction mode in which references samples encoded according to the DMVD are excluded;
in response to a determination that the constraint flag indicates that the DMVD is not excluded for the reference sample reconstruction, determining, in the same picture as the current block, the reference samples for the sample in the current block based on the intra prediction mode in which the reference samples encoded according to the DMVD are not excluded; and
reconstructing the sample of the current block according to the reference samples.

2. The method of claim 1, wherein the constraint flag has a first potential value that indicates that using intra prediction is permitted for the reference sample reconstruction, has a second potential value that indicates that using intra prediction and inter prediction is permitted for the reference sample reconstruction, and has a third potential value that indicates the exclusion of the DMVD for the reference sample reconstruction.

3. The method of claim 1, further comprising:
decoding a first constraint flag that indicates that using intra prediction and inter prediction is permitted for the reference sample reconstruction; and
decoding the constraint flag that is a second constraint flag that indicates of the exclusion of the DMVD for the reference sample reconstruction.

4. The method of claim 1, further comprising:
decoding a first constraint flag that indicates that using intra prediction is permitted for the reference sample reconstruction; and
decoding the constraint flag that is a second constraint flag that indicates the exclusion of the DMVD for the reference sample reconstruction.

5. The method of claim 1, wherein
the constraint flag indicates that using intra prediction is permitted for the reference sample reconstruction, and
the exclusion of the DMVD for the reference sample reconstruction is inferred from the constraint flag.

6. The method of claim 1, further comprising:
determining the reference samples in a DMVD non-latency region according to the intra prediction mode with the reference samples available for the reference sample reconstruction of the current block without delay.

7. An apparatus for video decoding, comprising:
processing circuitry configured to:
decode a constraint flag from a coded video bitstream, the constraint flag being indicative of an exclusion of decoder-side motion vector derivation (DMVD) for reference sample reconstruction;
decode prediction information of a current block from the coded video bitstream, the prediction information being indicative of an intra prediction mode;
in response to a determination that the constraint flag indicates that the DMVD is excluded for the reference sample reconstruction, determine, in a same picture as the current block, reference samples for a sample in the current block based on the intra prediction mode in which references samples encoded according to the DMVD are excluded;
in response to a determination that the constraint flag indicates that the DMVD is not excluded for the reference sample reconstruction, determining, in the same picture as the current block, the reference samples for the sample in the current block based on the intra prediction mode in which the reference samples encoded according to the DMVD are not excluded; and
reconstruct the sample of the current block according to the reference samples.

8. The apparatus of claim 7, wherein the constraint flag has a first potential value that indicates that using intra prediction is permitted for the reference sample reconstruction, has a second potential value that indicates that using intra prediction and inter prediction is permitted for the reference sample reconstruction, and has a third potential value that indicates the exclusion of the DMVD for the reference sample reconstruction.

9. The apparatus of claim 7, wherein the processing circuitry is further configured to:
decode a first constraint flag that indicates using intra prediction and inter prediction is permitted for the reference sample reconstruction using; and
decode the constraint flag that is a second constraint flag indicative of the exclusion of the DMVD for the reference sample reconstruction construction.

* * * * *